United States Patent [19]

Neuenschwander

[11] Patent Number: 5,451,314
[45] Date of Patent: Sep. 19, 1995

[54] PLANT FOR THE TREATMENT OF DRINKING WATER FROM RAW WATER

[76] Inventor: Peter Neuenschwander, Gartenstrasse 5c, CH-6331 Hünenberg, Switzerland

[21] Appl. No.: 234,371

[22] Filed: Apr. 28, 1994

[30] Foreign Application Priority Data

Apr. 9, 1994 [CH] Switzerland .............. 01044/94

[51] Int. Cl.⁶ .................................................. C02F 1/78
[52] U.S. Cl. ........................................ 210/138; 210/140; 210/143; 210/192; 422/186.14; 422/186.15
[58] Field of Search ............. 210/760, 192, 143, 96.1, 210/138–140; 422/186.09, 186.14, 186.15

[56] References Cited

U.S. PATENT DOCUMENTS

| | | | |
|---|---|---|---|
| 3,726,404 | 4/1973 | Troglione | 210/139 |
| 4,019,986 | 4/1977 | Burris et al. | 210/139 |
| 4,237,731 | 5/1982 | Powell | 128/287 |
| 4,548,716 | 10/1985 | Boeve | 210/652 |
| 4,587,213 | 5/1986 | Malecki | 435/39 |
| 4,767,525 | 8/1988 | Campbell et al. | 210/760 |
| 5,053,140 | 10/1991 | Hurst | 210/704 |
| 5,114,576 | 5/1992 | Ditzler et al. | 210/195.1 |
| 5,213,773 | 5/1993 | Burris | 422/256 |
| 5,241,720 | 9/1993 | Engel et al. | 8/158 |

*Primary Examiner*—Cynthia L. Nessler
*Attorney, Agent, or Firm*—Browdy and Neimark

[57] ABSTRACT

A plant (200) for treatment of drinking water from raw water has a treatment tank (202) which is supplied with raw water and a storage tank (204) placed downstream of the treatment tank. The treatment tank supplies water on demand to a point of use (224). The treatment tank and the storage tank are connected by a conduit (206), with a pump (208) to feed water from the treatment tank to the storage tank, and by an overflow pipe (210) to feed water back from the storage tank to the treatment tank. The pump is activated by a command device to feed sufficiently treated water to the storage tank when water is consumed at the point of use and when water in the treatment tank is re-ozonized at intervals between times of consumption of water at the point of use. In the latter case, water from the storage tank flows back to the treatment tank through the overflow pipe so that it can be reozonized in the treatment tank.

5 Claims, 4 Drawing Sheets

PLANT FOR THE TREATMENT OF DRINKING WATER FROM RAW WATER

BACKGROUND

The invention described in the present disclosure relates to plant for the treatment of drinking water from raw water, in accordance with the general terms set forth in patent claim 1.

The provision of drinking water that meets all quantitative and qualitative criteria is a worldwide problem whose solution is an important aspect of the basis of civilization as a whole.

Developing countries generally suffer from lack of water, particularly drinking water. On the one hand, this is due to the fact that the amount of water available is limited because of soil conditions and climate; on the other, because the means of water treatment and distribution are either lacking or supply water of inadequate hygienic quality.

Where water-distribution systems are scarce or non-existent, water is usually supplied from storage systems, such as groundwater or rainwater cisterns, or from large storage tanks refilled from time to time by tanker vehicles.

But general overuse of resources and the environmental pollution associated with it has also made the provision of an adequate supply of drinking water a problem in industrialized countries. Although densely populated regions in industrialized countries have water-distribution systems equipped with water-treatment plants, the quality of the water supply often only barely meets hygienic requirements or is no longer adequate for them, or the water tastes unpleasant because disinfectants and/or other chemicals have been added to it. And because of defects such as broken conduits and leaks, the distribution system itself also represents a constant risk of further water pollution.

Because of all these problems, there is a growing need of plant that can treat raw water and turn it into drinking water for domestic use. The raw water for such small systems can be supplied from small local springs, groundwater or rainwater cisterns, or by mains that otherwise fail to provide water of satisfactory quality. This type of plant makes use of various types of treatment process, for example by filters that remove larger particles, by reverse-osmosis equipment for desalination, and by activated-carbon filters for final purification, which may be used either separately or in series, as necessary. In order to obtain a hygienically satisfactory quality of water, ozone treatment of water has now for some time replaced the chlorination process usual in the past. Ozone treatment, in the literature also referred to as ozonization, is performed by the addition of active oxygen (ozone $=O_3$) to carbon. Except for fluorine, ozone is the strongest oxydizing medium known. It permits practically total neutralization of micro-organisms without making the water taste unpleasantly of chlorine. Ozone is in fact said to have a pleasant smell reminiscent of hay or wet grass after a summer thunderstorm.

Moreover, ozone is a relatively cheap oxydizing agent. To produce it, some $O_2$ molecules in the ambient air are split into oxygen atoms, which then combine with the remaining $O_2$ molecules to form $O_3$ molecules. Further, ozonization produces no undesirable waste materials, because ozone tends to break down again into $O_2$. Though ozone can in fact attack the human body, it is possible to avoid such an undesirable effect either by the total prevention of residual ozone in the drinking water, or by keeping it to a minimum or in a safe predetermined concentration.

PRIOR ART

Treatment plant for drinking water may be either flow- or batch-operated. Flow-operated plant is activated only when water is being taken from a supply point. This type of plant ozonizes the raw water supplied to it, and supplies the drinking water thus produced for immediate consumption.

Flow-operated plant needs no storage tank for the treated water and takes up relatively little room. But this advantage is offset by the great disavantage that an accurate check on the efficiency of the treatment is impossible, especially in the case of ozonization, because this can be done only in a tank or some other suitable type of container. Furthermore, tests of the running water are also impossible, particularly in a small system or a minisystem such as that considered in the present context, because the quantity of water at any given time varies considerably in accordance with the available pressure and the flow velocity.

A batch-operated system, on the other hand, readily allows measurements to be made at reasonable cost, to provide a check on the effectiveness of the treatment processes. This is true both of so-called tabletop systems that depend on a manual supply of raw water, and of systems fitted above or below the worktop which can be connected to mains for their raw-water supply.

U.S. Pat. No. 4,599,166 describes a batch-operated plant for the ozonization of domestic water, which is connected to a mains water supply. For this purpose the water is placed in a treatment tank where, after appropriate cooling, it is treated with ozone supplied by an ozone generator. Before use, the drinking water thus produced passes through an activated-carbon filter which removes practically all residual ozone. For this purpose a standard ozone generator is used to produce the ozone.

Unfortunately, it is a characteristic feature of ozone generators suitable for this type of application that they not only produce the required ozone, but also release amounts of nitric and nitrous acid that increase in accordance with the moisture content of the ambient air supplied to the ozone generator. These acids are undesirable on a number of counts. Acid deposits not only reduce the useful life of ozone generators; even less pleasant is the fact that the acid dissolves in drinking water after ozonization and creates a health hazard to the user.

SUMMARY OF DISCLOSURE

The purpose of the present invention is, therefore, to propose a plant of the type referred to above, but one that reliably prevents the formation of nitric and/or nitrous acid and its presence in the drinking water supplied, and thus ensures that the plant supplies only perfectly pure and safe drinking water.

The invention described in the present disclosure achieves this purpose by the characteristic features described in claim 1.

Preferred further embodiments of the plant described in the present disclosure are defined by the characteristic features set forth in the other patent claims hereof.

Provision of the elements described in the present disclosure, namely an air dehumidifier upstream of the ozone generator, a moisture monitor between the air dehumidifier and the ozone generator, and the additional components of the plant's control and monitoring system for the air dehumidifier and the moisture monitor, makes it possible to achieve considerable improvement in the plant's operation.

Firstly, the air dehumidifier prevents the ozone generator being supplied with moist air that would allow the formation of nitric and nitrous acid. As a result, it increases the ozone generator's useful life and prevents the dissolution of acid in the drinking water. Secondly, the moisture monitor keeps a check on the residual moisture content of the air supplied to the ozone generator and makes it possible to determine at any time whether the air dehumidifier is working properly. Thirdly, the additional components of the control and monitoring system ensure that any operational breakdown or malfunction of the air dehumidifier automatically switches off the plant. It will be obvious that only the combination of these three new components and their integration in the plant prevents pollution of the drinking-water supply by nitric or nitrous acid.

In plant as described that has only a single treatment tank, the user either cannot draw off drinking water for lengthy periods continuously or, after a period of continuous water consumption, plant designed for batch operation functions only more or less as a flow-operated system; but as stated above, this is undesirable. It is therefore preferable to place a storage tank downstream of the treatment tank; this storage tank's capacity should generally be greater than that of the treatment tank. A further advantage of this approach is that the storage tank from which the water is supplied to the point of use is always clean, by contrast with the treatment tank which may at different times contain water of varying degrees of impurity and must therefore be cleaned at more frequent intervals.

Small installations are often designed as tabletop systems. If the raw-water supply to these is manual, usually by means of a closable opening in the treatment tank, they do not need an electrical power supply, but no water connection. However, higher-performance plant should preferably be connected to a water-distribution system and have additional components of a control and monitoring system to ensure that the treatment tank is automatically kept topped up.

When no drinking water is used for any length of time, the treated water may become polluted again, for example by air-borne micro-organisms, either because the tank's seals are not tight or because minute residues of these organisms, which by themselves do not constitute a health hazard, have again been able to multiply while the water has remained stagnant in the tank. To ensure that the water supply is of the highest quality in spite of this, water already treated is subjected to repeat ozonization at regular intervals.

Though it would be possible to dry the air by heating, it is preferable to use air-dehumidification equipment that works by adsorption. Provided that all other conditions remain the same, the main reason for this technically more sophisticated solution is that the quantity of the ozone produced decreases when the temperature of the air supplied to the ozone generator increases. On the other hand, the design of adsorption-type air dehumidifiers ensures that the air which is to be dried passes through a container partly filled with a moisture-adsorbent material in pill or granulate form. After some time this material becomes exhausted, i.e. it can no longer absorb moisture, and must be replaced. In the past, adsorption-type air dehumidifiers were used only in large-scale water-treatment plant where skilled maintenance could be expected to ensure the timely replacement of exhausted adsorption material. The prevailing view was that the monitoring of the adsorption material's condition and its timely replacement by a fresh supply required specialist services and, for example, that regeneration of the adsorption material was possible only off-site and, therefore, that the procedures involved were too complex and the costs too high. Because this type of plant also lacked automatic monitoring of residual moisture, users would have the illusion of safety but no genuine protection against water containing acid. But these reservations are no longer valid, firstly, if an appropriate adsorption medium is used that indicates impending saturation by a change in the colour of its granules or pills and can simply be regenerated by being heated in a domestic baking oven; and secondly, if a moisture monitor is fitted between the air dehumidifier and the ozone generator, which continually checks the residual moisture content of the air, emits an optical and/or acoustic warning signal when the moisture content exceeds an upper tolerance limit, and automatically switches off the system.

A suitable moisture monitor might, for example, be a test box which contains a moisture indicator that reacts to the residual moisture content, and a detector that observes the moisture indicator. A suitable moisture indicator might, for example, be a paper strip across which the air from the air dehumidifier that is to be analyzed must pass and whose colour changes from red through violet to blue, in accordance with the moisture content of the air.

The detector may, for example, be a light source pointed at the indicator and a photodetector that measures the amount of the reflected light.

In addition, the moisture monitor is equipped with one of the components of the control and monitoring system which, as already stated, switches off the plant when the moisture content of the air exceeds a given limit, because it is preferable for the user to have no water at all than to use water that contains acid.

Additional measures can be taken to increase safety. In particular, a current monitor may be provided that makes it possible to determine whether the power supply to the ozone generator is adequate to ensure that a sufficient quantity of ozone is produced.

A further improvement is the provision of an air-flow monitor whose function is to determine whether air is supplied to the ozone generator and from there to the treatment tank.

BRIEF DESCRIPTION OF DRAWINGS

The embodiments referred to above and other preferred embodiments and details of the plant for the treatment of drinking water from raw water referred to in the present disclosure are described in greater detail below, by reference to several typical embodiments and in conjunction with the following drawings.

DETAILED DESCRIPTION OF INVENTION

Figure 1:
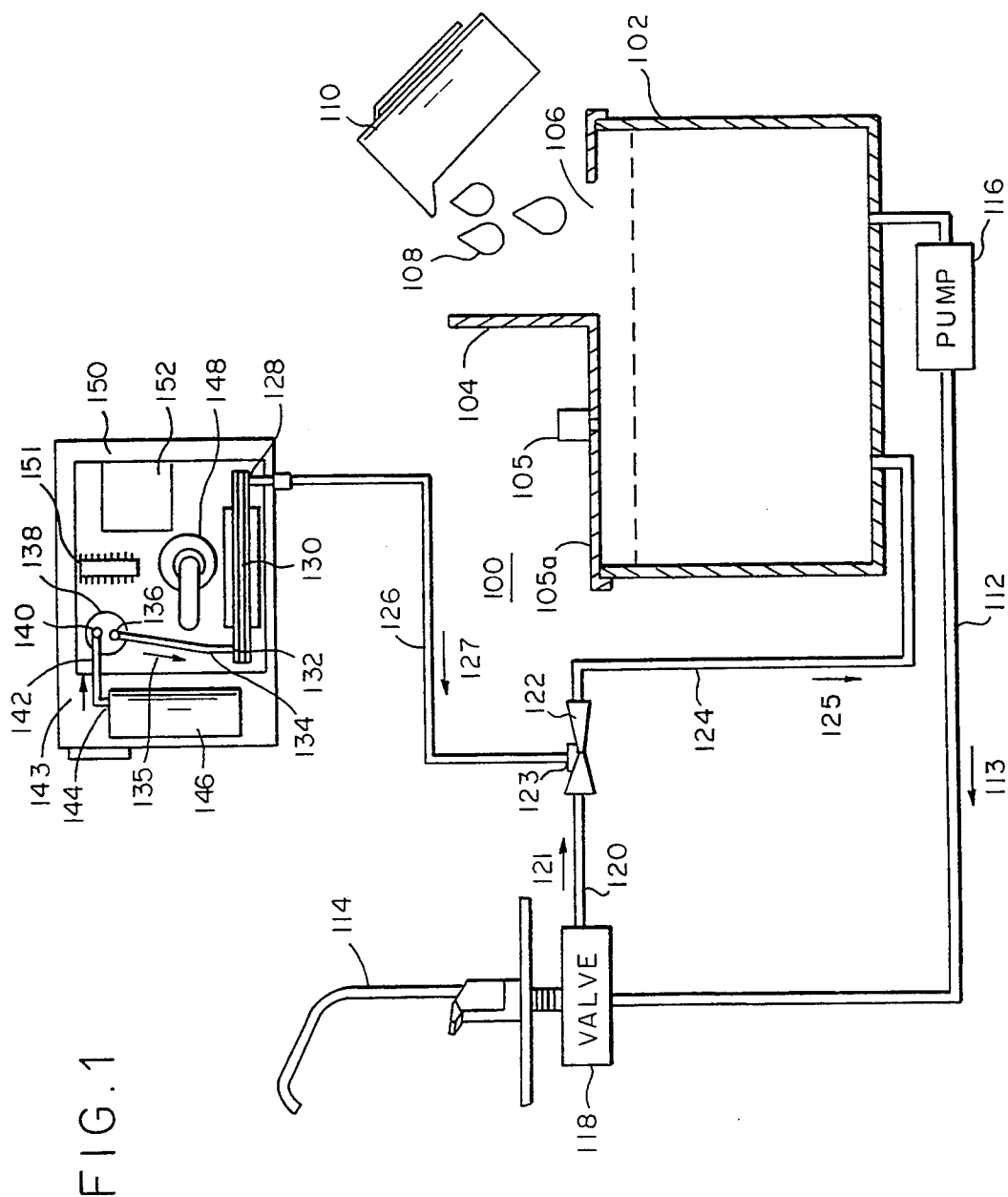
FIG. 1 shows diagrammatically and in simplified form a single-tank system to which raw water is supplied manually; for greater clarity, the control and monitoring system is not shown.

The plant shown in FIG. 1 consists of a treatment tank 102 which has an opening 106 on top that can be closed by a hinged flap 104, through which the tank is supplied with raw water 108 from a container 110 used as the raw-water source. From the treatment tank 102 a water conduit 112 goes to the point of use 114, here shown as a water tap or faucet. This water conduit 112 has a pump 116 that conveys the water in the direction shown by arrow 113. The water conduit 112 connects to a three-way valve 118 that can be switched from the user position which links the treatment tank 102 to the point of use 114, to an injector position that connects the treatment tank 102 to a branch conduit 120. The branch conduit 120, whose flow is shown by arrow 121, connects to an injector 122, from which a further conduit 124, whose flow is shown by arrow 125, returns to the treatment tank 102. A gas conduit 126, whose flow is shown by arrow 127, connects the narrowest zone 123 of the injector to the outlet 128 of an ozone generator 130. A gas conduit 134, whose flow is shown by arrow 135, connects the inlet 132 of the ozone generator 130 to the outlet 136 of a moisture monitor 138. The inlet 140 of the moisture monitor 138 is linked to the outlet 144 of an air dehumidifier 146 by a further gas conduit 142 whose flow is shown by arrow 143. A high-voltage transformer 148 is provided to supply energy to the ozone generator 130.

Further, so-called ozone-elimination granulate is provided in a first pressure-relief valve box 105 fitted on the lid 105a of the treatment tank 102, which must be semipermeable to permit gas to escape, and at the same time it must ensure that any gas released into the atmosphere no longer contains ozone.

The components 128 to 148 inclusive make up a single subassembly 150 which also includes an EEPROM 151 and a microcontroller 152 integrated in a processor; these are described in greater detail below.

The components so far described function as follows:

Raw water 108 from the container 110 is poured through the opening 106 to fill the treatment tank 102. In this process the water flows via the first conduit 112 to the three-way valve 118 set in its injector position and returns by conduit 124 to the treatment tank 102. The high flow velocity produces a partial vacuum in the narrowest part of the injector 123, so that ozone or a gaseous mixture that includes ozone is aspirated through the gas conduit 126 and mixed with the water that returns to the treatment tank 102. The high-voltage transformer 148 supplies energy to the ozone generator that generates ozone from ambient air after the air has passed through the air dehumidifier 146 and moisture monitor 138.

Ozonization of the water takes three to six minutes after power-on. A timer-controlled signal indicates when the water in the treatment tank is sufficiently ozonized. The treated water can then be drawn off at the point of use 114 from the treatment tank 102 via the first conduit 112. The user can consume only as much water as there is in the treatment tank. When the point of use 114 (tap or faucet) is opened, a mechanical link automatically switches over the three-way valve 118 and allows the water to flow out. The control and monitoring system automatically blocks the pump 116 when the water is untreated, and this prevents untreated water being drawn off at the point of use 114.

When no drinking water is consumed for any length of time, the water in the treatment tank 102 is automatically reozonized. In this type of plant, an automatic control and monitoring system as described below in connection with the type 200 plant shown in FIG. 2 controls and regulates all processes and procedures other than the supply of the raw water as such.

Figure 2:
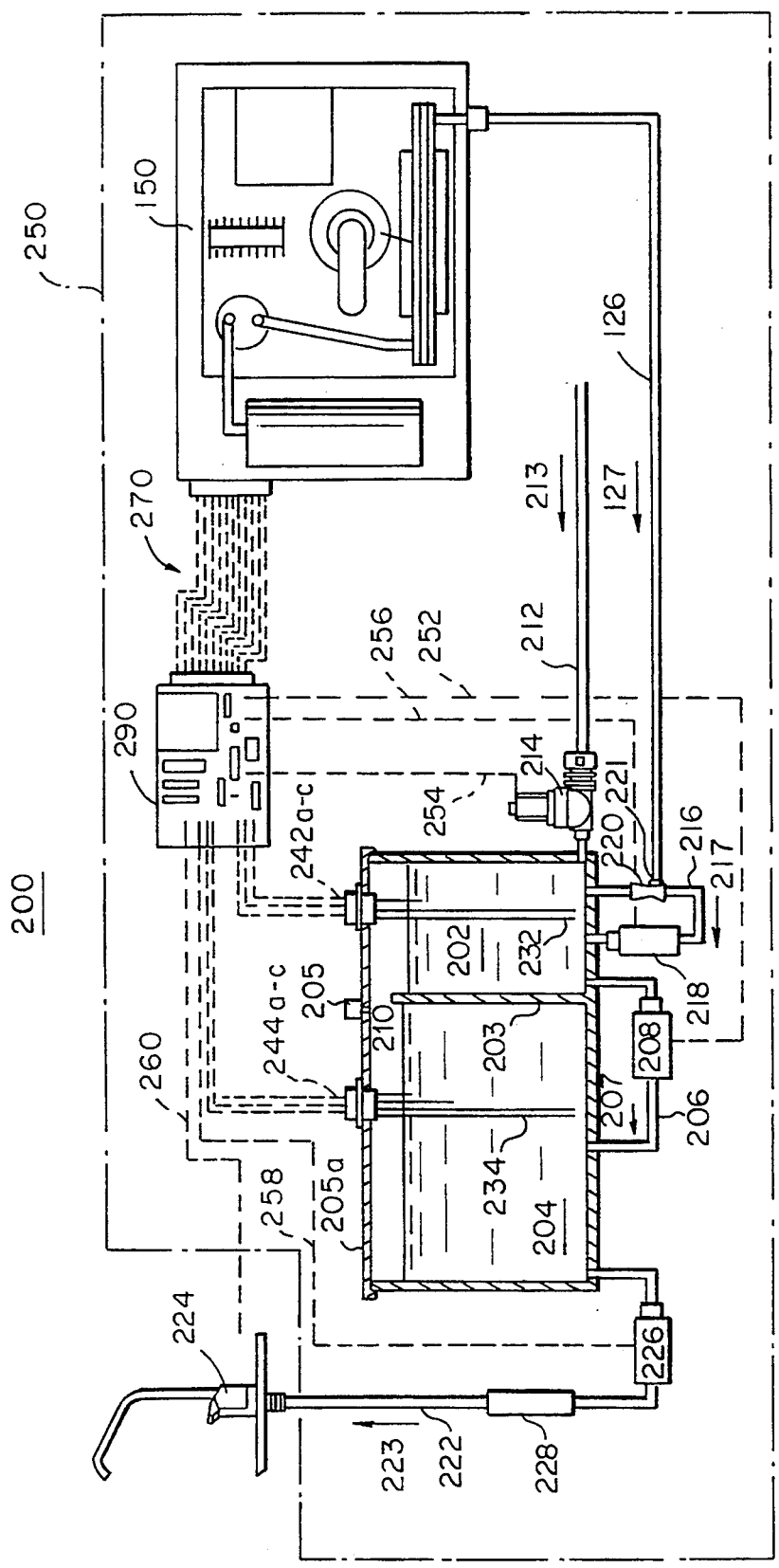
FIG. 2 shows diagrammatically and in simplified form a two-tank plant connected to a water-distribution system, complete with the associated control and monitoring system.

The plant shown in FIG. 2 has a storage tank 204 in addition to the treatment tank 202. In this typical embodiment, the treatment tank 202 and the storage tank 204 are two chambers in a single tank separated by a partition 203. A conduit 206 equipped with a pump 208, whose flow is shown by arrow 207, connects the treatment 202 and storage 204 tanks to each other; in addition, an overflow pipe or (as indicated in this typical embodiment) an opening 210 near the top of the partition 203 also connects the two chambers. Provision is made to ensure that no ozone ($O_3$) is released into the atmosphere. For this purpose an ozone-eliminating granulate is provided in a second pressure-relief valve box 205 fitted to the lid 205a of the storage tank 204, whose function is the same as that of the first pressure-relief valve box 105 described for the type 100 plant.

A conduit 212, whose flow is shown by an arrow 213, connects the treatment tank $2O_2$ via a magnetic valve 214 to a raw-water source (not shown). In addition, a recirculating pipe 216, whose flow is shown by arrow 217, has a pump 218 and an injector 220; both extremities of this pipe 216 terminate in the treatment tank 202. A conduit 222, whose flow is shown by arrow 223, connects the storage tank 204 to the point of use 224. This conduit 222 has a pump 226 and either a carbon filter or an activated-carbon filter 28. Finally, this type 200 plant also has a subassembly 150' whose design and layout is the same as that of subassembly 150 in a type 100 plant, and the outlet of the ozone generator 130 is linked to the narrowest part of the injector 221. Except for the point of use 224, all the components of this type 200 plant form a single assembly 250.

The components of a type 200 plant, as described up to this point, function as follows:

The conduit 212 and the magnetic valve 214 in its open state close off the treatment tank 202, and the pump 218 supplies the water by the recirculating pipe 216; in this process, water also flows through the injector 220. As described above in connection with FIG. 1, the flow velocity through the narrowest part of the injector 221 produces a partial vacuum, which aspirates a mixture of air and ozone from the subassembly 150'. The function of the subassembly 150' is the same as that described for subassembly 150 in the context of FIG. 1. As stated above, ozonization is timer-controlled and takes about three to six minutes. When the water in the treatment tank 202 is sufficiently ozonized, flow through the recirculating pipe 216 ceases. The pump 208 then conveys the treated water through the conduit 206 to the storage tank 204. When the treatment tank 202 is nearly empty, the same procedure as described is repeated until the storage tank 204 is full again. When there is a demand for water at the point of use 224, the pump 226 conveys water from the storage tank 204 through the conduit 222 to the point of use 224, and the carbon filter removes any residual ozone.

When no drinking water is consumed for any length of time, the water is automatically reozonized, as in a type 100 plant. But in the present case, the water in the treatment tank 202 is reozonized first, in exactly the same way as in the initial ozonization process. The pump 208 then pumps the reozonized water through the conduit 206 to the storage tank 204 where it mixes with the water already in the tank and thus to some extent also reozonizes it. The water level in the storage tank 204 continues to rise until it reaches the overflow or opening 210 in the partition 203, and returns to the treatment tank. This process continues until all the water in both tanks is reozonized.

The next section of this description refers to the layout and functions of the various components of the control and monitoring system of a type 200 plant. FIG. 2 shows all the links of this system as dashed lines. These links begin at a control circuit board 290.

The following links are provided: three links, 242a, 242b, and 242c, to a first two-stage level-measuring device 232 in the treatment tank 202; three links, 244a, 244b, and 244c, to a second three-stage level-measuring device 234 in the storage tank 204; one link 252 to pump 208; one link 254 to the magnetic valve 214; one link 256 to pump 218; one link 258 from pump 226; one link 260 to the point of use 224; and a large number of links 270 to the various components of subassembly 150'.

Figure 3:
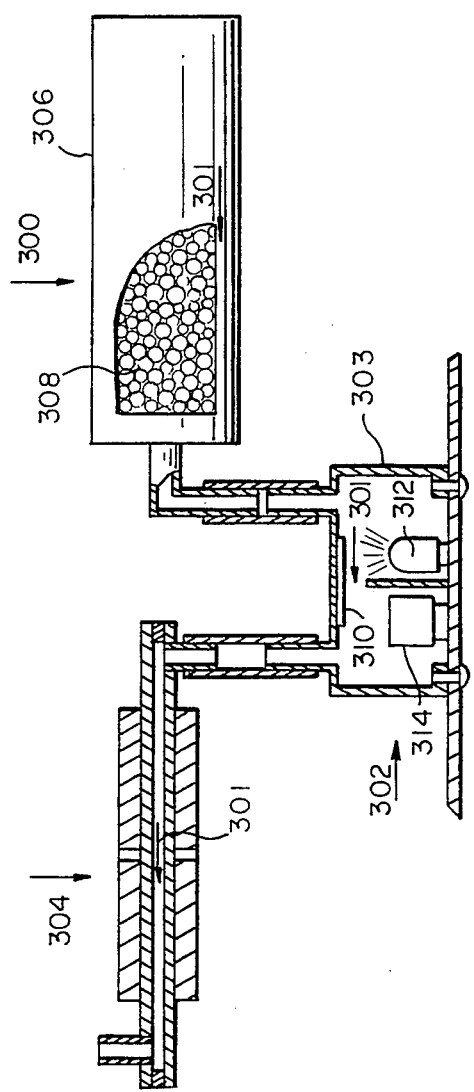
FIG. 3 shows diagrammatically and in simplified form an ozone generator that has an air dehumidifier and a moisture monitor fitted upstream.

The general principle that applies to all type 200 plant is that except for immovable parts such as tanks and conduits, each part of the plant is equipped with a component of the control and monitoring system. These components mainly consist of elements fitted to the parts themselves and of those that form part of the circuit board, and are connected to each other by the links briefly referred to above. All parts can be activated from the control-circuit board; on the one hand, this ensures that all functions run in proper time sequence and, on the other, it triggers corrective action and safety measures when accidental breakdowns and malfunctions occur. In particular, the functions, corrective action, and safety measures include the following:

Monitoring of the moisture content of the air supplied to the ozone generator, as described in greater detail in the context of FIG. 3; monitoring of the power supply to the ozone generator from the high-voltage transformer, to ensure the production of ozone; monitoring of the air flow between the ozone generator and the injector, to ensure the ozone supply to the injector. Further safety precautions ensure reozonization after a power failure. As a general rule, reozonization after a power failure is automatic; but to prevent reozonization being started after only minor power failures, a condenser in a memory unit of the subassembly 150' stores the last state before the power failure. When the power supply is restored after a power failure and there is still a measurable amount of voltage in the condenser, this prevents reozonization.

In the context of the control and monitoring system of a type 200 plant, note that in order to make this type of plant adaptable to circumstances, such as differences in the quality of the raw water available, variations in the moisture content and temperature of the ambient air, and changes in the required quality of the drinking water, the timing and time intervals of some of the plant's functions are adjustable as necessary, as are also some of the standard values with which the effective values are compared.

The air dehumidifier and moisture monitor are major components of all type 100 and type 200 plant.

FIG. 3 shows an air dehumidifier 300, a moisture monitor 302, and an ozone generator 304; the arrows 301 indicate the flow direction in each case.

The main element of the air dehumidifier 300 is an oblong container 306 filled with a suitable adsorption medium 308, usually in the form of pills or granulate particles. In this context, the most suitable adsorption media are those that contain an indicator material such as cobalt chloride which changes colour when the medium should be replaced because its adsorption capacity is nearly exhausted. As already stated, some adsorption media now available can be readily regenerated in an ordinary domestic baking oven, but to avoid the permanent loss of adsorption capacity, it is advisable to observe the recommended oven temperatures and regeneration times at least approximately. Of course, the use of adsorption media that change colour makes sense only if the container 306 is at least partly transparent. The moisture monitor 302 is one of the components of the safety and monitoring system and is closely related to the air dehumidifier. When the adsorption medium has been replaced and the plant is switched on again, it checks that the air is dry, and ozone production starts only when that is the case.

The main element of the moisture monitor 302 is a test box 303. The dehumidified air flows through this box. A moisture indicator 310 is fixed in the path of the air flow; in the present typical embodiment this indicator is paper-based and is thus also referred to as an indicator paper. Made of absorbent paper, it is impregnated with suitable chemicals and changes colour in accordance with the moisture content and the flow velocity of the air that passes over it. Further, the test box 303 also contains a light source 312—in the present typical embodiment a light-emitting diode (LED)—whose rays are beamed to the moisture indicator 310, and a photodetector 314 that measures the proportion of the rays reflected by the moisture indicator 310. The photodetector 314 registers the amount of light reflected by the colour of the moisture indicator 310, and this enables it to determine the moisture content of the air. The moisture monitor 302 is connected to a component of the control and monitoring system and switches off the plant if the photodetector 314 finds that the moisture content of the air exceeds a given maximum value.

This monitoring of the flow velocity and moisture content of the air is an important feature of the plant described in the present disclosure. The moisture monitor 302 should preferably be connected to an acoustic and/or an optical signal emitter that jointly and separately, as the case may be, to draw attention to the fact that the plant is switched off. In this connection, note that paper-based moisture indicators produce non-standard values when the air temperature is above or below a given range.

The ozone generator 304 is of a standard type usual for this type of ozonization plant; it is therefore not described in greater detail.

Figure 4:
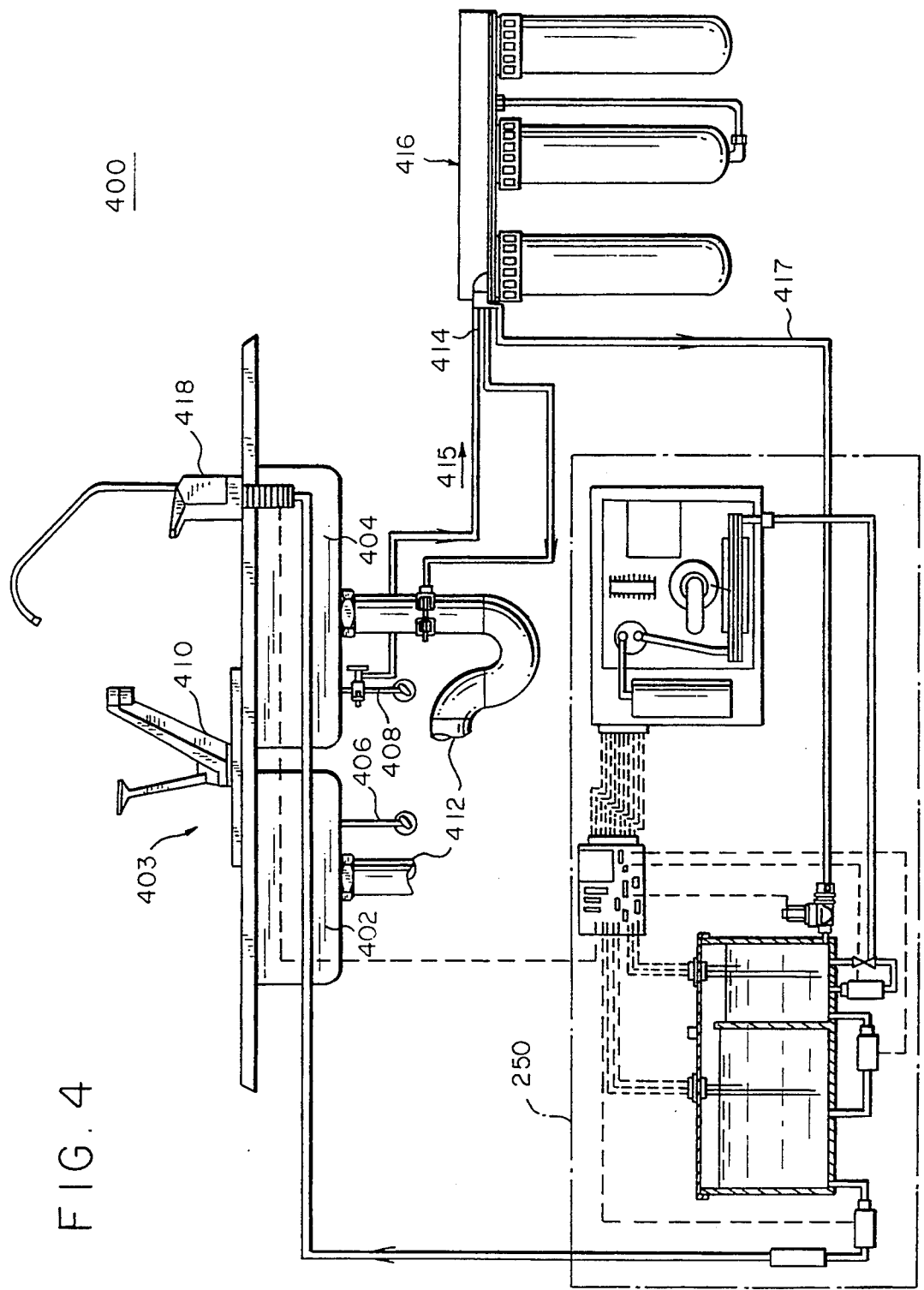
FIG. 4 shows diagrammatically and in simplified form the plant shown in FIG. 2, but with reverse-osmosis equipment installed upstream, the complete system being suitable for installation under a kitchen sinktop.

FIG. 4 shows a complete type 400 (domestic) plant, consisting of a typical sinktop 403 with two basins 402 and 404, a hot-water connection 406, a cold-water connection 408, a mixing valve 410, and a waste system 412. The type 400 plant is designed to perform a multistage treatment of raw water supplied from the cold-water connection that acts as the raw-water source. First of all, a conduit 414, whose flow is in the direction shown by the arrow 415, takes this water to a reverse-osmosis plant 416, and thence to an ozonization plant similar to the assembly 250 in FIG. 2, which is therefore numbered 250 in FIG. 4 also. From the ozonization plant 250, the treated water is then conveyed to the point of use 418.

FIG. 4 shows that an assembly 250 can be simply and readily integrated in an existing system that is limited to reverse-osmosis treatment of the water, i.e. where the conduit 417 does not go to an assembly 250 but directly to the point of use 418.

Finally, we again draw attention to the fact that, because of its air dehumidifier and moisture monitor, the new plant described in the present disclosure not only supplies perfect-quality drinking water; in addition, the large number of components of the control and monitoring system ensures the proper operation of this type of plant at all times and in all circumstances, and its safety in the event of breakdowns and malfunctions.

Figure 5:
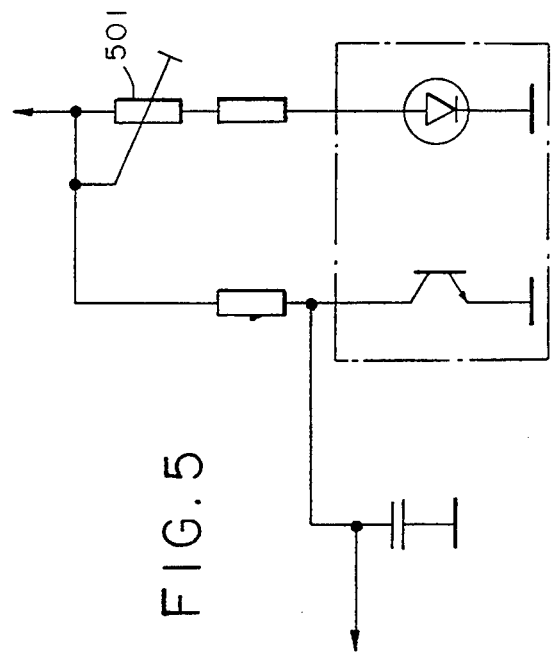
FIG. 5 shows a detail of the electrical circuit diagram for the plant shown in FIG. 2.

FIG. 5 shows a detail of the electrical circuit diagram for the moisture monitor 310 shown in FIG. 3, which has an adjustable potentiometer 501 for setting the limiting values for the photodetector 314.

I claim:

1. A plant for treating water to produce drinking water from raw water, comprising:
   a treatment tank in which the water is treated;
   a raw water source, upstream from the treatment tank, from which the raw water is supplied to the treatment tank;
   a storage tank, downstream of the treatment tank, in which the drinking water is stored;
   a treated-water conduit connecting the storage tank to a point of use for supplying the drinking water from the storage tank to the point of use;
   an ozone generator for producing ozone from ambient air;
   a gas conduit connecting the ozone generator to the treatment tank, the gas conduit supplying ozone from the generator to the treatment tank;
   a transfer conduit connecting the storage tank to the treatment tank, the transfer conduit further including a pump for feeding the water from the treatment tank to the storage tank;
   an overflow pipe connecting the storage tank to the treatment tank, the overflow pipe feeding the water back from the storage tank to the treatment tank;
   a control and monitoring system for controlling and monitoring the plant, the control and monitoring system comprising means for operating the pump selectively upon consumption of water at the point of use and at time intervals between periods of consumption of the water;
   an air dehumidifier connected upstream of the ozone generator for drying the ambient air supplied to the ozone generator; and
   a moisture monitor connected between the air dehumidifier and the ozone generator; wherein
   the control and monitoring system further includes means for controlling the air dehumidifier according to moisture measurements of the moisture monitor, and wherein
   the moisture monitor further comprises a light source, paper having means for changing a paper color according to the moisture content of the air, and photodetecting means for responding to intensity and color of light reflected from the light source by the paper.

2. The plant according to claim 1, wherein the control and monitoring system includes means for monitoring electrical current supplied by a high-voltage transformer to the ozone generator and means for switching off the plant if the current exceeds a threshold value.

3. The plant according to claim 1, wherein the control and monitoring system includes means for monitoring an amount of ozone supplied to the treatment tank within a time interval and means for switching off the plant if the amount exceeds a threshold value.

4. The plant according to claim 1, wherein the control and monitoring system includes means for supplying fresh ozone to the treatment tank to re-ionize the water within a certain time interval following a power failure.

5. The plant according to claim 1, wherein the control and monitoring system includes means for monitoring flow through the gas conduits to insure that ozone for the sterilization of the water is supplied to the treatment tank and means for switching off the plant in event of breakdown or malfunction.

* * * * *